Oct. 20, 1936.                D. MAPES                    2,058,244
                    AIRCRAFT FLOTATION DEVICE
                       Filed July 14, 1934              3 Sheets-Sheet 1
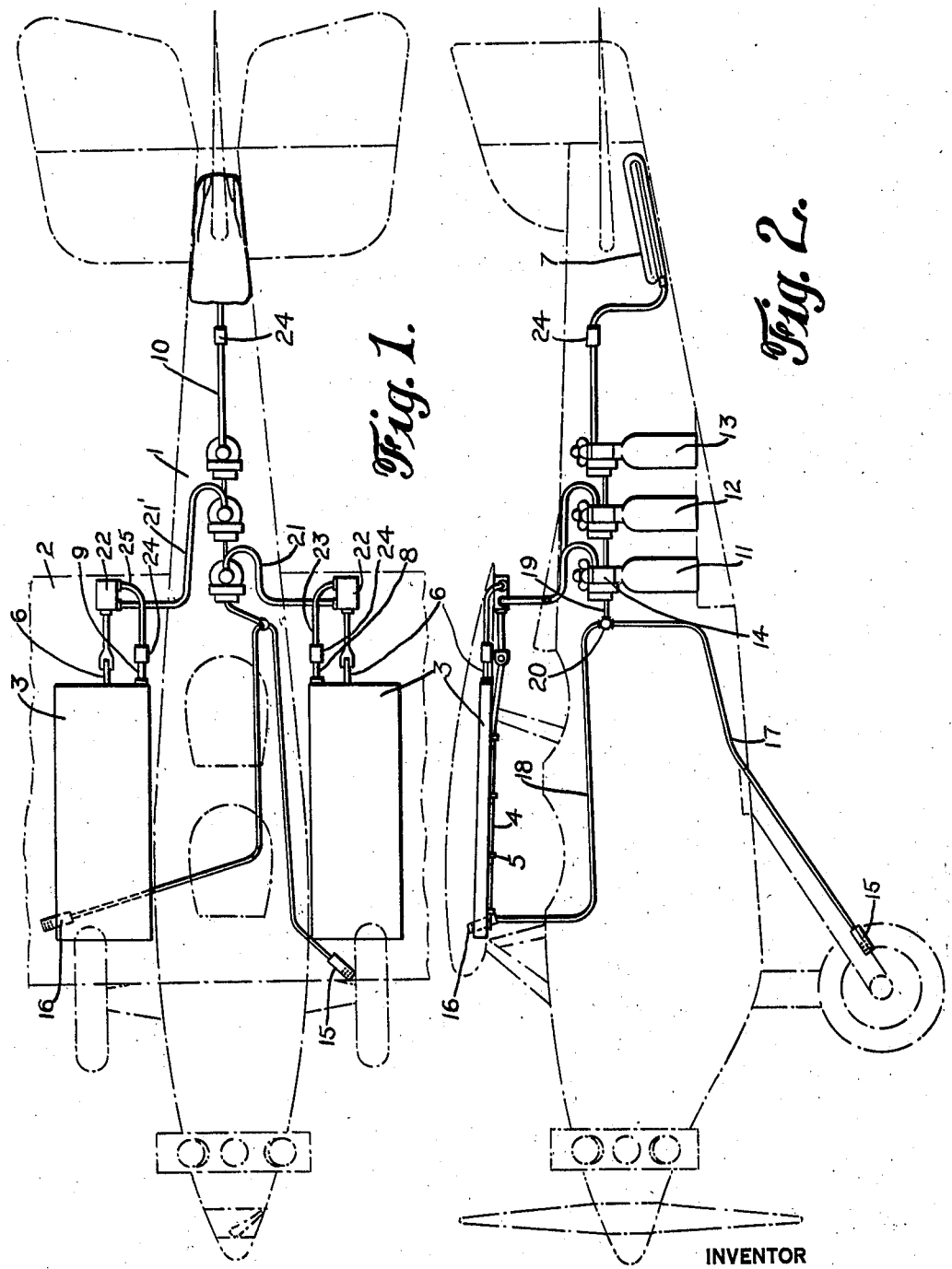
INVENTOR
Daniel Mapes
BY
J. William Carson
ATTORNEY Oct. 20, 1936.   D. MAPES   2,058,244
AIRCRAFT FLOTATION DEVICE
Filed July 14, 1934   3 Sheets-Sheet 2

INVENTOR
Daniel Mapes
BY
J. William Carson
ATTORNEY

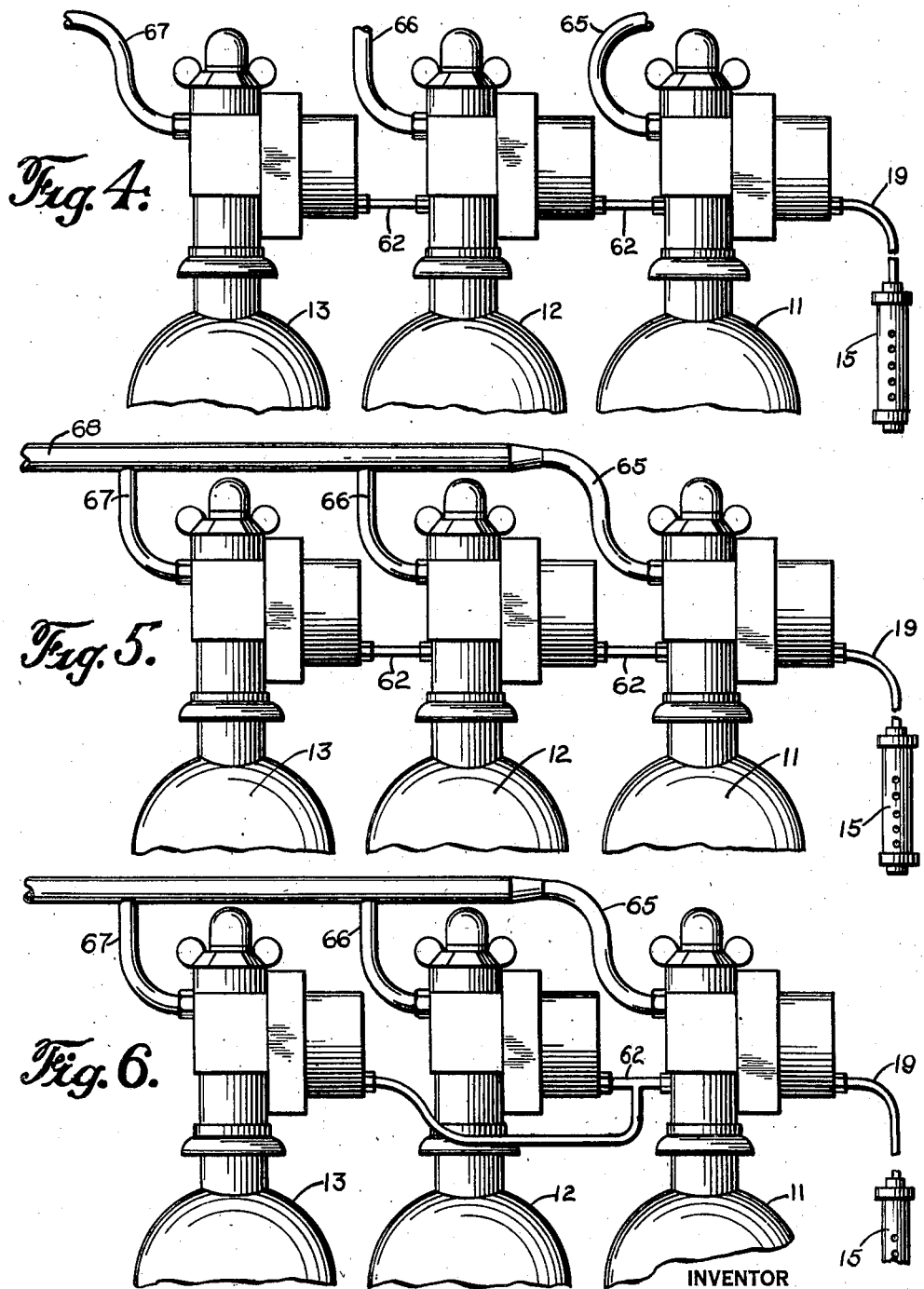

Patented Oct. 20, 1936

2,058,244

UNITED STATES PATENT OFFICE 2,058,244

AIRCRAFT FLOTATION DEVICE

Daniel Mapes, Upper Montclair, N. J., assignor to Walter Kidde & Company, Inc., Bloomfield, N. J., a corporation of New York Application July 14, 1934, Serial No. 735,148

14 Claims. (Cl. 221—73.5)

The present invention relates to flotation equipment for aircraft of the type comprising an arrangement wherein inflatable devices are provided on the aircraft and are adapted to be filled with a buoyant fluid when the aircraft descends upon a body of water. More specifically, the invention embodies, in combination with the arrangement above referred to, apparatus for automatically releasing a supply of buoyant fluid, stored under pressure in a plurality of containers, and discharging the same into the inflatable devices when the aircraft alights upon a body of water.

The apparatus in accordance with the present invention is in general quite similar to that shown and described in my copending application Serial No. 515,717, filed February 14, 1931, but differs therefrom in the provision of novel means for automatically releasing the fluid from a plurality of containers thereof, either simultaneously or substantially simultaneously.

In designing aircraft flotation equipment of the type comprehended by the present invention, in which a plurality of inflatable bags are provided and are adapted to be inflated with a buoyant fluid stored under pressure, the quantity of buoyant medium required is determined by the weight of the aircraft structure to be maintained afloat and by the volume of the inflatable bags necessary to give the desired degree of buoyancy. In some instances the quantity of fluid required is such that several containers of standard size are necessary to store the fluid, while in other cases separate containers are desirable as a matter of safeguard against leakage of the pressure medium, the leakage of fluid from one of a plurality of containers not being as serious as leakage from a single container flotation equipment. In still other cases it is desirable to insure even or balanced distribution of the pressure fluid to the various inflatable flotation bags, so that in this instance also one or more containers individually connected to each bag constitute the most certain means of giving the desired distribution, particularly when it is considered that in flotation systems of the type referred to, the flotation bags are isolated from each other by nonreturn valves which prevent reverse flow of the pressure fluid from bag to bag, thus preventing undesirable deflation of the bags but at the same time preventing equalization of the pressure in the bags if, for any reason, the distribution of the fluid should be initially uneven.

In connection with aircraft flotation equipment of this nature, it is highly important that the fluid should not be released prior to the alighting of the craft upon water, since the great resistance offered by the inflated devices to the travel of the aircraft through the air would be dangerous.

To eliminate, as far as possible, the personal equation as a factor in the operation of devices of this character, the present invention has been designed and provides a structure wherein the supply of buoyant fluid is automatically released to inflate the inflatable devices upon contact of the aircraft with any body of water upon which it should alight.

A simple and effective means of automatically releasing the inflating fluid upon initial contact of the aircraft with water is shown and described in my above referred to copending application, said means comprising a fluid release device operable by slight fluid pressure and means to utilize the water pressure head available upon immersion of the aircraft in water to effect operation of the fluid release device.

However, as apparatus of the type referred to is usually designed to release upon the development of a small static head, e. g. in the neighborhood of six inches of water, it not being desirable to have the aircraft settle too far in the water before operating the flotation system, the problem arises as to how to insure the operation of a plurality of fluid release devices with such a small available pressure. The present invention contemplates the solution of this problem by utilizing the available static head to release the first of a plurality of fluid release devices, and to use a pressure developed by the initially operated fluid release device, independent of the pressure of the medium in the initial fluid container, to release one or more of the remaining fluid release devices.

It should be noted that the use of a developed pressure which is independent of the pressure of the medium stored in the containers is an important feature of the present invention, as it insures certainty of operation of the entire system even though a container or containers be empty by reason of leakage of the pressure fluid therefrom.

It is accordingly an object of the present invention to provide an aircraft flotation system wherein the supply of buoyant fluid is automatically released from a plurality of containers thereof to inflate the inflatable devices upon contact of the aircraft with any body of water upon which it should alight.

A further object of the invention is to provide a system of the above character which functions automatically upon initial contact of the aircraft with water regardless of whether the aircraft alights upon the water in an upright or in an inverted position.

A further object of the invention is to provide an automatic mechanism for actuating flotation equipment of the above character, wherein advantage is taken of a very slight pressure, such, for example, as a static head in the neighborhood of six inches of water, to release the inflating mechanism of the equipment.

It is a further object of the present invention to provide a system for releasing pressure fluid from a plurality of containers thereof, either simultaneously or substantially simultaneously, utilizing a slight developed fluid pressure to release one container and employing a pressure developed upon operation of said container and independent of the pressure of the fluid stored in said container to release one or more of the remainder of the plurality of containers.

It is another object of the invention to provide a fluid release mechanism of the above character, wherein the elements of the releasing device are so designed as to be capable of manual resetting without difficulty and further to be insensitive to jars or other disturbing stresses while being highly sensitive to a predetermined actuating force.

A further object of the invention is to provide a mechanism which effectively prevents accidental inflation of the equipment upon accidental discharge of the buoyant fluid due to dangerous increases in temperature and pressure of the inflating medium stored in the containers.

Further objects, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 4 is a view showing one method of connecting a plurality of containers in accordance with the present invention both for operation and for discharge of the contained fluid.

Figure 5 is a view similar to Figure 4 showing another way of connecting a plurality of containers in accordance with the invention.

Figure 6 is another view similar to Figure 4 showing still another way of connecting a plurality of containers in accordance with the present invention.

Figure 3:
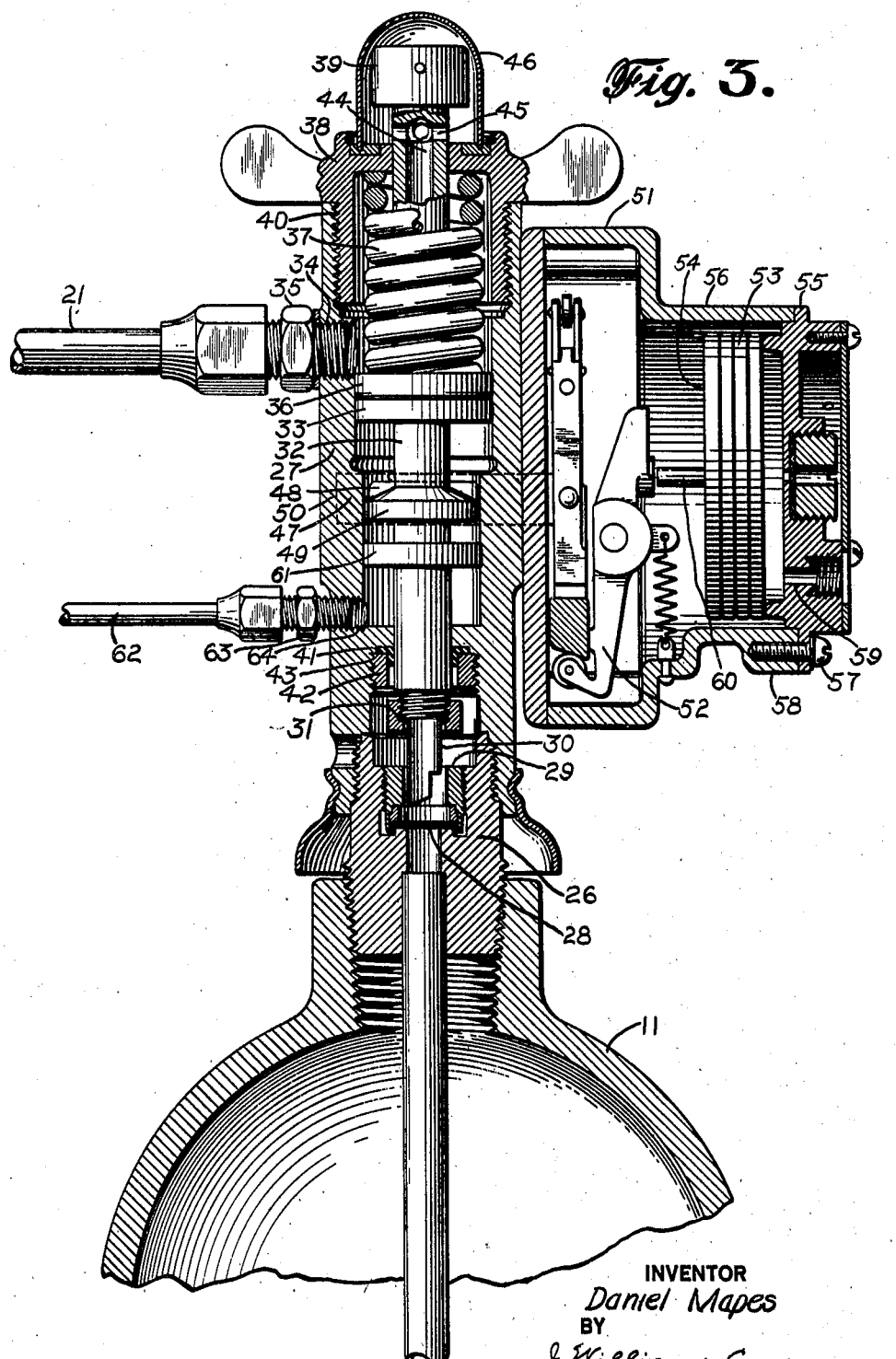
Figure 3 is a view in transverse section showing a fluid releasing mechanism constructed in accordance with the present invention.

Referring to Figures 1 and 2 of the above drawings, an aeroplane fuselage is indicated at 1, and the wing of the aeroplane at 2. On the underneath side of the wing and within the stream line of the wing are set flotation bag containers 3, each containing a normally deflated flotation bag retained within the container by means of wires 4 which pass through ringlets 5 to maintain the cover of each container closed. In order that the flotation bags may be secured effectively to the plane rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. Another flotation bag 7, normally deflated, is provided within the aft compartment of the fuselage, but this bag need not be stored in a container, as it is in an out-of-the-way location and as it is already within the stream lines of the plane. For the purpose of expanding the flotation bags, conduits 8, 9 and 10 are connected to the respective bags, the conduits being respectively connected to the pressure medium containers 11, 12 and 13.

Each of the pressure medium containers 11, 12 and 13 is provided with a releasing mechanism 14, described in detail hereinafter, the releasing mechanism of the first container 11 being actuated by pressure developed upon immersion in water of one of the actuator members 15 or 16, the operating pressure being transmitted to the releasing mechanism of the container 11 through either the tube 17 or the tube 18, both of which are connected to the pressure inlet connection 19 through a special fitting 20, forming no part of the present invention, which fitting prevents pressure developed by the actuator 15 from escaping through the actuator 16, at the same time preventing pressure developed by the actuator 16 from escaping through the actuator 15. The releasing mechanisms of the pressure medium containers 12 and 13 are respectively operated by pressures developed within the releasing mechanisms of the containers 11 and 12, all in a manner hereinafter to be described.

Upon release of the medium within the pressure medium container 11, it passes through a discharge line 21 into one end of a piston bag release 22, driving the piston toward the right, as viewed in Figures 1 and 2, and disengaging the wires 4 from the ringlets 5. When the piston in the piston bag release 22 reaches the end of its stroke, the medium escapes through a conduit 23, a check valve 24 and the conduit 8 into the flotation bag, thus causing it to expand in accordance with the pressure of the medium. During the inflation of the bag the cover of the container 3, containing such bag, lifts so as to permit the free inflation of the bag. By providing a check valve as indicated at 24 the medium which has expanded into the flotation bag is prevented from escaping therefrom, continued passage of the medium into the bag being freely permitted. The flotation bag contained in the other container 3 is similarly inflated from the pressure medium container 12, the pressure medium being discharged into the flotation bag through the discharge line 21', another piston bag release 22, the conduit 25, another check valve 24, and the conduit 9. The flotation bag 7 is inflated directly through the conduit 10, no piston bag release being necessary, but only a check valve 24.

Referring now to Figure 3 of the drawings, a container 11 is provided, within which a supply of a medium under pressure is maintained by means of a closure body 26 and a bonnet 27. The closure body 26 is threaded into the top of the container 11 and is provided with a frangible disc 28 secured in position by a nut 29. A cutter 30 is movable within the nut 29, the cutter being mounted by means of a nut 31 on a hollow cutter stem 32. The cutter stem 32 is formed with a flange 33 having a close-working fit on its circumferential surface within the bore of the bonnet 27. An outlet 34 is provided in the bonnet for receiving a fitting 35 which is adapted to be connected to a discharge line 21. The flange 33 on the cutter stem is preferably disposed so as to be nearer the container 11 than the outlet 34, as described in further detail hereinafter.

Before the cutter stem 32 is assembled in the bonnet 27, a cup leather 36 is passed over the upper portion of the stem and seated by a spring 37, which provides the actuating force for moving the cutter and the cutter stem toward the container. The spring 37 is seated against a nut 38, which is a combined sealing and resetting nut, a stop 39 being provided on the upper end of the stem to limit the movement of the stem toward the container. The stop 39 also serves as an indicator, in a manner which will be hereinafter described.

The above described cutter assembly is inserted in the bonnet 27 and the combined sealing and resetting nut 38 is run into position by means of threads 40 on the bonnet and the nut.

Before the bonnet 27 is coupled to the closure body 26, a leather washer 41 is passed over the end of the cutter stem and secured in position by means of a nut 42 having threads 43 which engage co-operating threads on the bonnet 27. The cutter 30 is then secured to the lower end of the cutter stem 32 by means of the already referred to nut 31.

In the above described mechanism, the hollow cutter 30 communicates with the hollow portion 44 of the cutter stem, which hollow portion communicates with the atmosphere by means of openings 45 formed in the upper end of the cutter stem. The normal position of the cutter stem is as indicated in Figure 3, the stem being shown in its upper position, the cutter 30 lying some distance above the frangible disc 28, and the openings 45 communicating with the spaces beneath the fracturable cap 46. When, therefore, the pressure medium is released from the container when the frangible disc 28 ruptures due to an excessive pressure of the medium within the container 11, the pressure medium will be discharged into the atmosphere through the cutter 30, the hollow portion 44 of the cutter stem 32, and the openings 45, the pressure of the escaping medium being sufficient to rupture the fracturable cap 46, thus permitting the escape of the pressure medium to the atmosphere.

Extending within the bonnet 27 is a spindle 47 which is formed with a groove 48 for engaging a flange 49 on the cutter stem 32. The spindle 47 is pivoted in the bonnet at 50 and extends exteriorly thereof within a lever chamber 51, this lever chamber being suitably secured to the bonnet.

The foregoing description relates to a disc rupturing mechanism and means for discharging the contents of a pressure medium container into a discharge line, such mechanism having been found particularly adaptable for use with the present invention. The means for releasing the foregoing mechanism includes a series of levers arranged within the lever chamber 51 and serving to hold the spindle 47 in restraint until such time as the lever system is actuated. Since the lever system itself forms no part of the present invention, it has neither been shown nor will it be described in detail herein, as a suitable lever system has already been shown and described in my copending application for Letters Patent of the United States, Serial No. 515,717, filed February 14, 1931. For the purpose of the present invention it is sufficient to note that actuation of the last lever of the series, shown at 52, disengages the entire lever system and permits the spindle 47 to turn under the force exerted by the spring 37 to disengage the groove 48 from the flange 49. Such disengagement permits the cutter 30 to be advanced into the disc 28 and effects the rupturing thereof, thus causing the discharged medium to flow into the discharge line 21, the stop 39 engaging the upper surface of the combined sealing and resetting nut 38, thus serving to limit the downward movement of the cutter 30. Of course, when the stop 39 engages the upper surface of the nut 38, the openings 45 recede within the chambered portion of the nut 38, thus establishing a path for the flow of the pressure medium through the ruptured frangible disc, the hollow cutter 30, the passage 44 in the cutter stem 32, the openings 45, and the chambered portions of the nut 38 and the bonnet 27 to the outlet 34 and thence to the discharge line 21.

In accordance with the present invention, the stop 39 in conjunction with the fracturable cap 46 serves as an indication that the release mechanism has been operated. In order to render the indicating means more effective in its indication, a suitable inscripton such as "Set" may be made on the circumference of the stop 39, and the fracturable cap 46 may be rendered opaque, however, leaving a transparent circumferential band on the cap so positioned that the inscription "Set" will normally show through the transparent band when the cutter stem 32 is in its uppermost position as shown in Figure 3. As soon, however, as the releasing mechanism has been actuated, the inscription "Set" will disappear behind the lower opaque portion of the cap 46, thus serving to indicate that the apparatus is not "Set", but has been released. Of course, when the pressure medium is released from the container by the rupturing of the frangible disc 28 due to the development of an excessive pressure within the container, the fracturable cap 46 is fractured as already described hereinabove, and the fracturing of the cap serves as an indication, not only that the container 11 is empty, but that the container has been discharged by reason of the development of an excessive pressure therein.

The manner in which the lever 52 is actuated will now be described. This actuation is effected by a bellows-like member 53 provided with a closed end 54 and supported on its open end by means of an airtight connection with the member 55. The member 55 is supported on an extension 56 of the lever chamber 51 by means of screws 57 inserted into supporting lugs 58 carried on the extension 56. A passage 59 in the member 55 communicates with the interior of the bellows-like member 53 and is adapted to be connected to a pressure inlet connection 19 (see now Figure 2) to the other end of which is connected the actuators 15 or 16, which serve to develop the operating pressure for the releasing mechanism. Upon the development of the necessary operating pressure, the bellows-like member 53 moves toward the left (Figure 3), carrying with it the pin 60 which is secured to the closed end 54 of the member 53. The pin 60 then forcibly engages the lever 52, causing it to disengage the lever system and permitting the releasing mechanism to be actuated in the manner already described.

The construction of the actuators 15 and 16 will not be described in detail as the construction may be in accordance with my copending application hereinabove referred to, reference to which may be had.

The description thus far has dealt with the construction and operation of a fluid release mechanism for a single container. Therefore, the manner in which a plurality of containers 11 is released, in accordance with the present invention, will now be described, first of all in connection with Figure 3, in which will be found a piston-like flange 61 formed on the cutter stem 32 and engaging the bore of the bonnet 27 with a close-working fit. That portion of the bore of the bonnet 27 which lies below the piston 61 communicates with a relatively small bore tubing 62 through the medium of a coupling member 63 threaded into an outlet passage 64 in the bonnet. The tubing 62 is then connected to the passage 59 of the bellows supporting member 55 of the disc rupturing mechanism of another pressure medium container to be discharged, successive containers being connected, for example, as shown in Figure 4 of the drawings, in which figure certain reference numerals have been employed corresponding to those used in connection with the description of Figures 1 and 2.

In view of the foregoing construction, when the disc rupturing mechanism of the first container in a group of containers to be released, has been operated, as for example by the pressure developed upon immersion of one of the actuators 15 or 16 in water, thus advancing the cutter stem 32 and forcing the cutter 30 through the frangible disc 28, a previously nonexistent pressure is built up in the chambered portion of the bonnet 27 lying beneath the piston 61, by reason of the rapid descent of the piston 61, and this developed pressure is transmitted through the tubing 62 to the bellows-like member of the fluid release mechanism of the next succeeding container, causing operation of the fluid release mechanism of that container. Then, upon operation of the fluid release mechanism of the last named container, the pressure developed in said fluid release mechanism acts to effect release of the fluid release mechanism of the next container. Thus, any number of fluid release mechanisms may be operated in rapid succession with the aid of substantially instantaneously developed previously nonexisting pressure, the operation of the entire system being self sustaining after the application of a small actuating force to the actuating member of the fluid release mechanism of the first container in the group of containers to be discharged.

It is an important feature of the present invention that the fluid release mechanisms of the successive containers are releasable without the aid of any stored pressure, so that the system is operable even if one or more of the containers in the group of containers to be discharged has been emptied by leakage.

It should also be noted that, in order to insure the building up of the desired operating pressure upon the descent of the piston 61, the piston is arranged within the bore of the bonnet 27 with a close-working fit, thus preventing leakage of the compressed air above the piston; while the leather washer 41, which is compressed around the cutter stem 32 by the nut 42, serves to prevent leakage of the compressed air downwardly. At the same time, the tubing 62 is preferably of a small internal diameter and of as short a length as possible, so as to have only a small undesirable effect on the pressure which must be built up.

It might also be well to note that the cup leather 36 serves to seal the upper portion of the chamber of the bonnet 27 from the portion beneath the flange 33, so that the high pressure fluid medium is unable to reach the low pressure portion of the fluid release mechanism, as a high pressure would tend to damage the lever chamber 51 and the bellows-like member 53. At the same time the cup leather 36 and the leather washer 41 serve to isolate the developed pressure portion of the fluid release mechanism from the high pressure portions.

Referring again to Figure 4, it will be noted that separate discharge lines 65, 66 and 67 are provided for each of the fluid release mechanisms, the arrangement of Figure 4 being directly adaptable for use in the flotation system shown in Figures 1 and 2.

The arrangement of Figure 5 is generally similar to that of Figure 4, except that the discharge lines 65, 66 and 67 empty into a common manifold 68, such an arrangement being useful where the flotation bags are connected to a common manifold, or where several standard size containers of pressure fluid are necessary for inflating a single flotation bag.

The arrangement of Figure 6 is generally similar to that of Figure 5, but differs from the arrangements of both Figures 4 and 5 in the manner of connection of the fluid release mechanisms for operation thereof. Thus, in Figure 6, the fluid release mechanism of the container 11 is arranged to be operated by an actuator 15, while the fluid release mechanisms of both the containers 12 and 13 are arranged for parallel operation by the pressure developed upon operation of the fluid release mechanism of the container 11.

It will, therefore, be apparent that the present invention may be adapted for use with systems arranged in any number of ways both with respect to the operation of the fluid release mechanisms and with respect to the manner of discharging the pressure fluid, the essential feature being to employ a relatively small developed pressure to actuate one or more containers in a group of containers to be discharged.

It will of course be appreciated that the fluid release mechanisms of all of the containers need not be constructed exactly alike, although as a practical matter it would probably be undesirable to employ fluid release mechanisms of different construction, particularly as difficulty might be encountered in connecting the containers in their proper relation, either initially or after the containers have been recharged, if all of the fluid release mechanisms were not of the same type. However, it should nevertheless be noted that the fluid release mechanisms of the containers 13 in Figures 4 and 5 need not be provided with piston members 61 and the outlet connections associated therewith. Similarly, the fluid release mechanisms of the containers 12 and 13 of Figure 6 need not be of the same construction as the fluid release mechanism of the container 11.

It will of course be readily apparent that the present invention is adaptable for other purposes than in connection with aircraft flotation systems, so long as there is need for discharging a plurality of containers, whether such other use be on aircraft or otherwise; and that the initial container in a group of containers to be discharged may be set off by any suitable source of pressure. For example, when the invention is employed in connection with a fire extinguishing system, the operating pressure may be developed by the heating of a confined body of air in an air thermostat of any of the types now well known in the fire extinguishing art. Of course, the initial container need not be pressure operated at all, but may be operated manually, electrically, or in any other suitable manner.

From the foregoing description it will be seen that I have provided simple and effective means for releasing pressure fluid from a plurality of containers where only a small initial operating force is available. It will further be seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing from the spirit and scope of the invention, and I therefore do not wish to be strictly limited to the disclosure, but rather to the scope of the appended claims.

I claim:

1. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, means to release said releasable means, a chamber alterable in volume by movement of a wall thereof to compress air within the chamber, means to effect movement of a wall thereof by movement of the spindle, and means defining a fluid conducting path from said chamber to a device to be actuated by the air pressure developed in said chamber.

2. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, means to release said releasable means, a chamber encompassing a portion of the spindle and alterable in volume by movement of a wall thereof to compress air within the chamber, means to effect movement of a wall thereof by movement of the spindle, and means defining a fluid conducting path from said chamber to a device to be actuated by the air pressure developed in said chamber.

3. In a system for releasing a medium from a plurality of containers in which the medium is stored under pressure and in which each container is provided with a medium releasing device comprising a body member, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, and fluid pressure operated means to release said releasable means, a separate chamber associated with each medium releasing device alterable in volume by movement of a wall thereof to compress a fluid within the chamber, means to effect movement of a wall of each said chamber by each said spindle, means defining a fluid conducting path from the chamber of one medium releasing device to the fluid pressure operated means of another medium releasing device, the arrangement being such that the chamber and fluid pressure operated means of successive medium releasing devices are connected for operation in tandem upon operation of the medium releasing device of the head container in the tandem arrangement, and means to release the releasable means of the head container.

4. In an apparatus for releasing a medium from a pair of containers in which the medium is stored under pressure, one being a head container, and the other being an end container, the head container being provided with a medium releasing device comprising a body member, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, means to release said releasable means, a chamber alterable in volume by movement of a wall thereof to compress a fluid within the chamber, and means to effect movement of a wall thereof by movement of the spindle; and the end container being provided with a medium releasing device comprising a body member, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, and fluid pressure operated means to release said releasable means; and means defining a fluid conducting path from the chamber of the head container to the fluid pressure operated means of the end container, whereby operation of the medium releasing means of the head container will effect operation of the medium releasing means of the end container.

5. In an apparatus for releasing a medium from a plurality of containers comprising a head container, at least one intermediate container, and an end container, in which the medium is stored under pressure, the head container being provided with a medium releasing device comprising a body member, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, means to release said releasable means, a chamber alterable in volume by movement of a wall thereof to compress a fluid within the chamber, and means to effect movement of a wall thereof by movement of the spindle; the intermediate containers being each provided with a medium releasing device comprising a body member, a frangible disc carried by the body member and confining the medium within the container; disc rupturing means for rupturing the frangible disc to release the medium, a spindle on which the disc rupturing means is mounted, means normally urging the disc rupturing means and spindle toward the disc, releasable means normally restraining the last named means, fluid pressure operated means to release said releasable means, a chamber alterable in volume by movement of a wall thereof to compress a fluid within the chamber, and means to effect movement of a wall thereof by the spindle; and the end container being provided with a medium releasing device comprising a body member, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, and fluid pressure operated means to release said releasable means; means defining a fluid conducting path from the chamber of the head container to the fluid pressure operated means of an intermediate container, means defining fluid conducting paths from the chambers of the intermediate containers to the fluid pressure operated means of other intermediate containers in succession, and means defining a fluid conducting path from the chamber of the last intermediate container to the fluid operated means of the end container, whereby operation of the medium releasing means of the head container will effect operation in succession of the medium releasing means of the intermediate containers and the end container.

6. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, means normally urging the disc rupturing means toward the disc, releasable means normally restraining the last named means, means to release said releasable means, a chamber alterable in volume by movement of a wall thereof to compress a fluid within the chamber, means to effect movement of a wall thereof upon operation of the disc rupturing means, and means defining a fluid conducting path from said chamber to a device to be actuated by the fluid pressure developed in said chamber.

7. In a releasing device for releasing a medium from a container in which the medium is stored under pressure, the combination of a body member to be secured to the container, a frangible disc carried by the body member and confining the medium within the container, disc rupturing means for rupturing the frangible disc to release the medium, a spindle on which the disc rupturing means is mounted, means normally urging the disc rupturing means and spindle toward the disc, releasable means normally restraining the last named means, means to release said releasable means, a chamber alterable in volume by movement of a wall thereof to compress a fluid within the chamber, means to effect movement of a wall thereof by movement of the spindle, and means defining a fluid conducting path from said chamber to a device to be actuated by the fluid pressure developed in said chamber.

8. In a system for releasing a medium from a plurality of containers in which the medium is stored under pressure and in which each container is provided with a medium releasing device comprising a body member, a frangible disc carried by the body member and confining the medium within the container, disc rupturing means for rupturing the frangible disc to release the medium, means normally urging the disc rupturing means toward the disc, releasable means normally restraining the last named means, and fluid pressure operated means to release said releasable means, a chamber alterable in volume by movement of a wall thereof to compress a fluid within the chamber, means to effect movement of a wall of the chamber, and means defining a fluid conducting path from said chamber to each of said fluid pressure operated means, whereby the latter are operated by the fluid compressed in said chamber.

9. In a releasing device for releasing a medium from a container in which the medium is stored under pressure of the type comprising a frangible disc confining the medium within the container and disc rupturing means for rupturing the frangible disc to release the medium, a chamber alterable in volume by movement of a wall thereof to compress a fluid within the chamber, means to effect movement of a wall thereof upon operation of the disc rupturing means, and means defining a fluid conducting path from said chamber to a device to be actuated by the fluid pressure developed in said chamber.

10. In a releasing device for releasing a medium from a container in which the medium is stored under pressure having a frangible closure to retain the medium within the container and means to puncture the closure to release the medium, a chamber alterable in volume by movement of a wall thereof to compress a fluid within the chamber, means to effect movement of a wall thereof upon actuation of the closure puncturing means, and a fluid outlet for said chamber.

11. In a releasing device for releasing a medium from a container in which the medium is stored under pressure, the combination of a body member to be secured to the container having a passage therethrough, a closure for said passage, means to open said closure, means normally tending to move said first named means to closure opening position, releasable means normally restraining the second named means, means to release said releasable means, a chamber alterable in volume by movement of a wall thereof to compress a fluid within the chamber, means to effect movement of a wall thereof by movement of the first named means, and a fluid outlet for said chamber.

12. In a releasing device for releasing a medium from a container in which the medium is stored under pressure, the combination of a body member to be secured to the container having a passage therethrough, a closure for said passage, means to open said closure comprising a spindle and means normally urging the spindle to its closure opening position, releasable means normally restraining the last named means, means to release said releasable means, a chamber alterable in volume by movement of a wall thereof to compress a fluid within the chamber, means to effect movement of a wall thereof by movement of the spindle, and means defining a fluid conducting path from said chamber to a device to be actuated by the fluid pressure developed in said chamber.

13. In a releasing device for releasing a medium from a container in which the medium is stored under pressure, the combination of a chambered body member to be secured to the container, a frangible disc carried by the body member and confining the medium within the container, disc rupturing means for rupturing the frangible disc to release the medium, a spindle having a part thereof at least within the chamber of the body member on which the disc rupturing means is mounted, means normally urging the disc rupturing means and spindle toward the disc, releasable means normally restraining the last named means, means to release said releasable means, a piston-like member carried by said spindle within the chamber of the body member and engaging the wall thereof with a close working fit, said piston-like member serving to compress the air in the portion of the chamber beneath the piston-like member when the spindle moves toward the frangible disc, and a fluid outlet for said portion of the chamber.

14. In a releasing device for releasing a medium from a container in which the medium is stored under pressure, the combination of a chambered body member to be secured to the container having a passage therethrough, a closure for said passage, means to open said closure comprising a spindle having a part thereof at least within the chamber of the body member and means normally urging the spindle to its closure opening position, releasable means normally restraining the last named means, means to release said releasable means, a piston-like member carried by said spindle within the chamber of the body member and engaging the wall thereof with a close working fit, said piston-like member serving to compress the air in the portion of the chamber beneath the piston-like member when the spindle moves toward its closure opening position, and a fluid outlet for said portion of the chamber.

DANIEL MAPES.